United States Patent Office 3,427,075
Patented Feb. 11, 1969

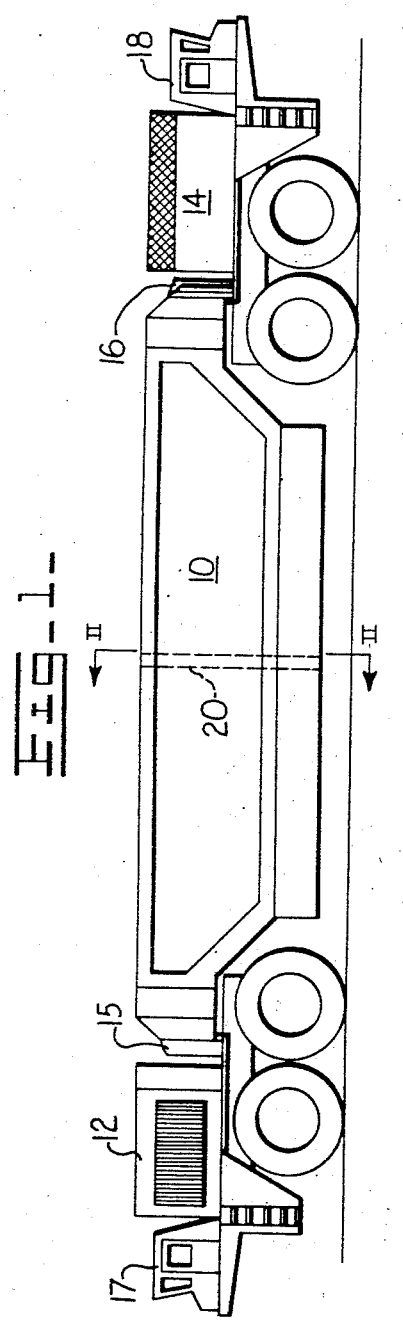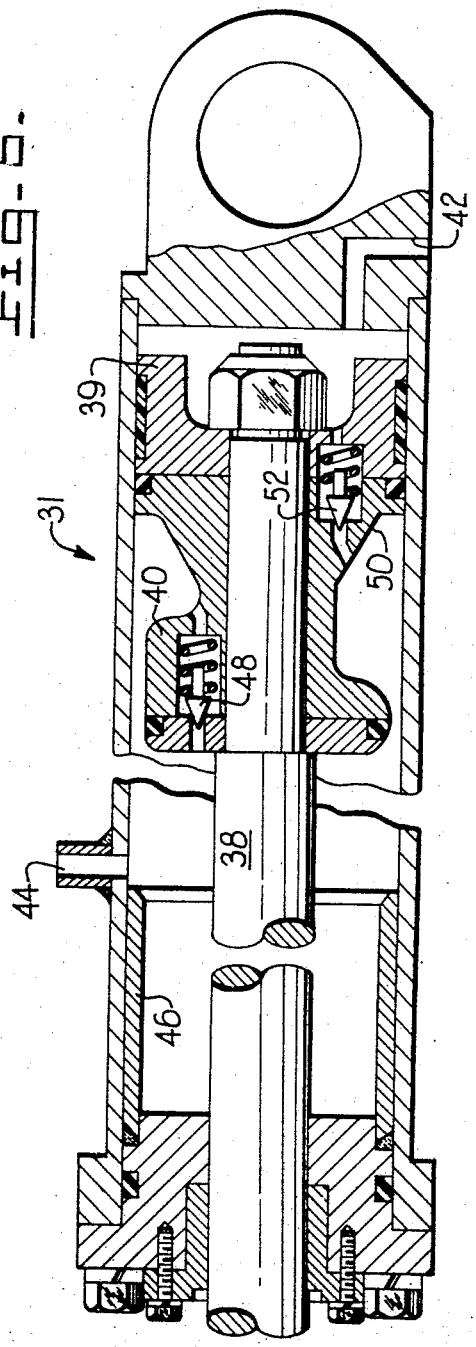

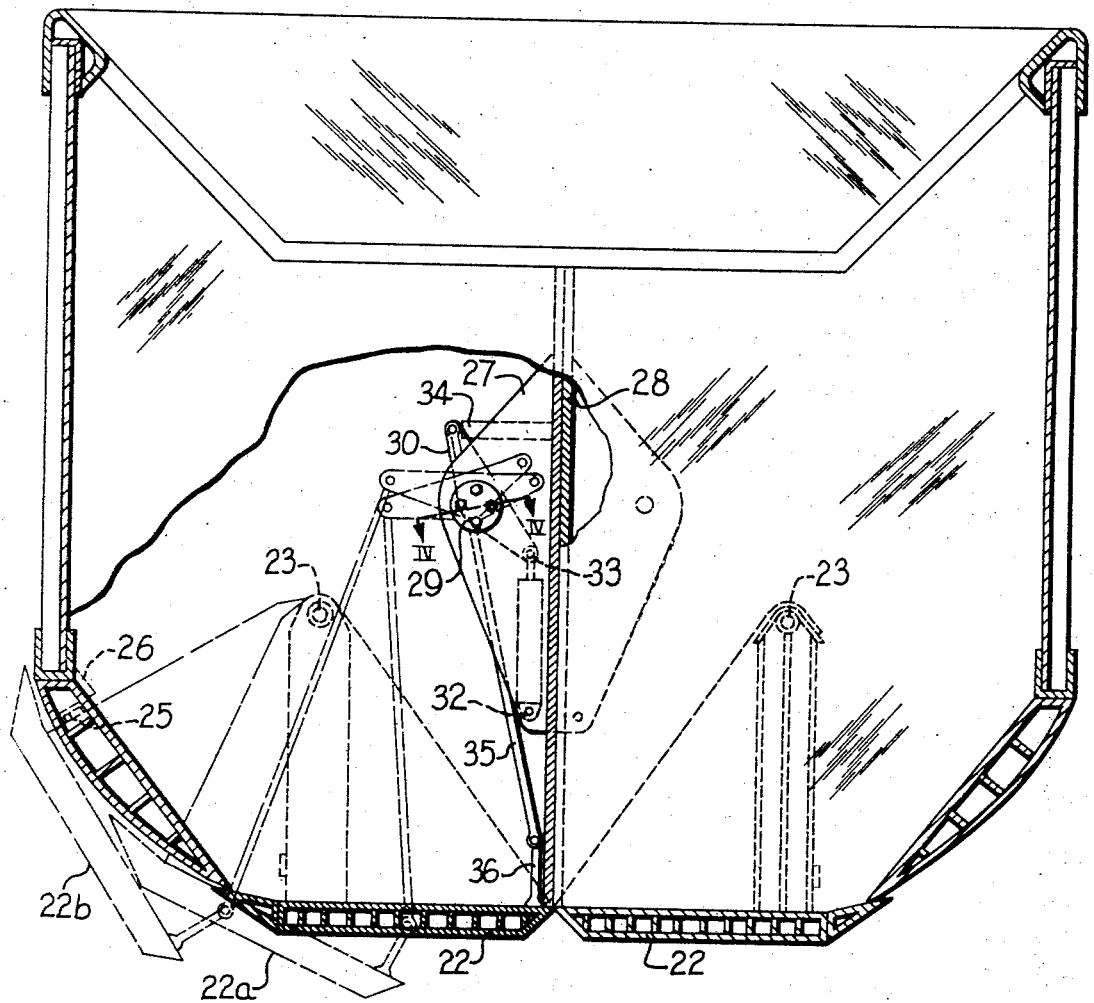

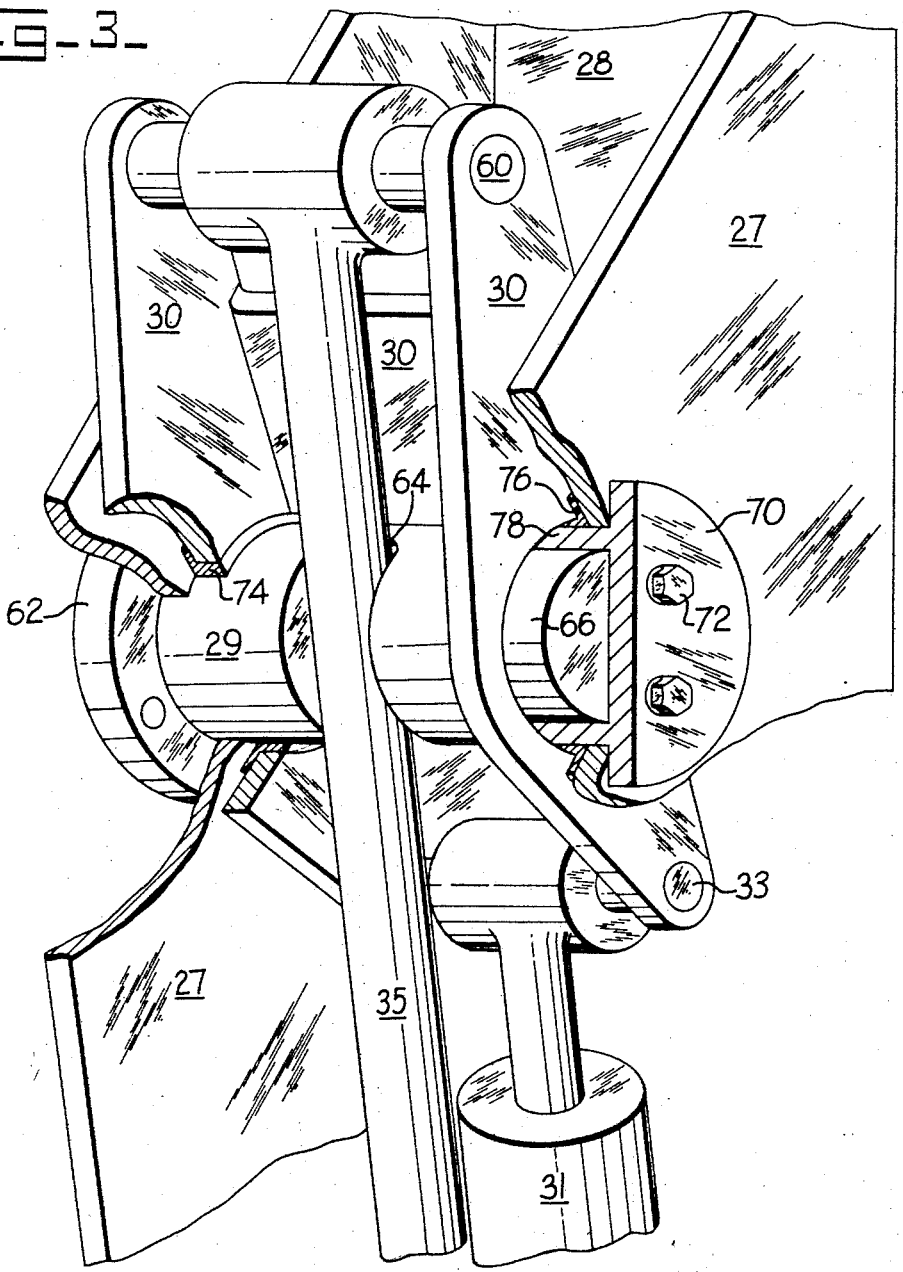

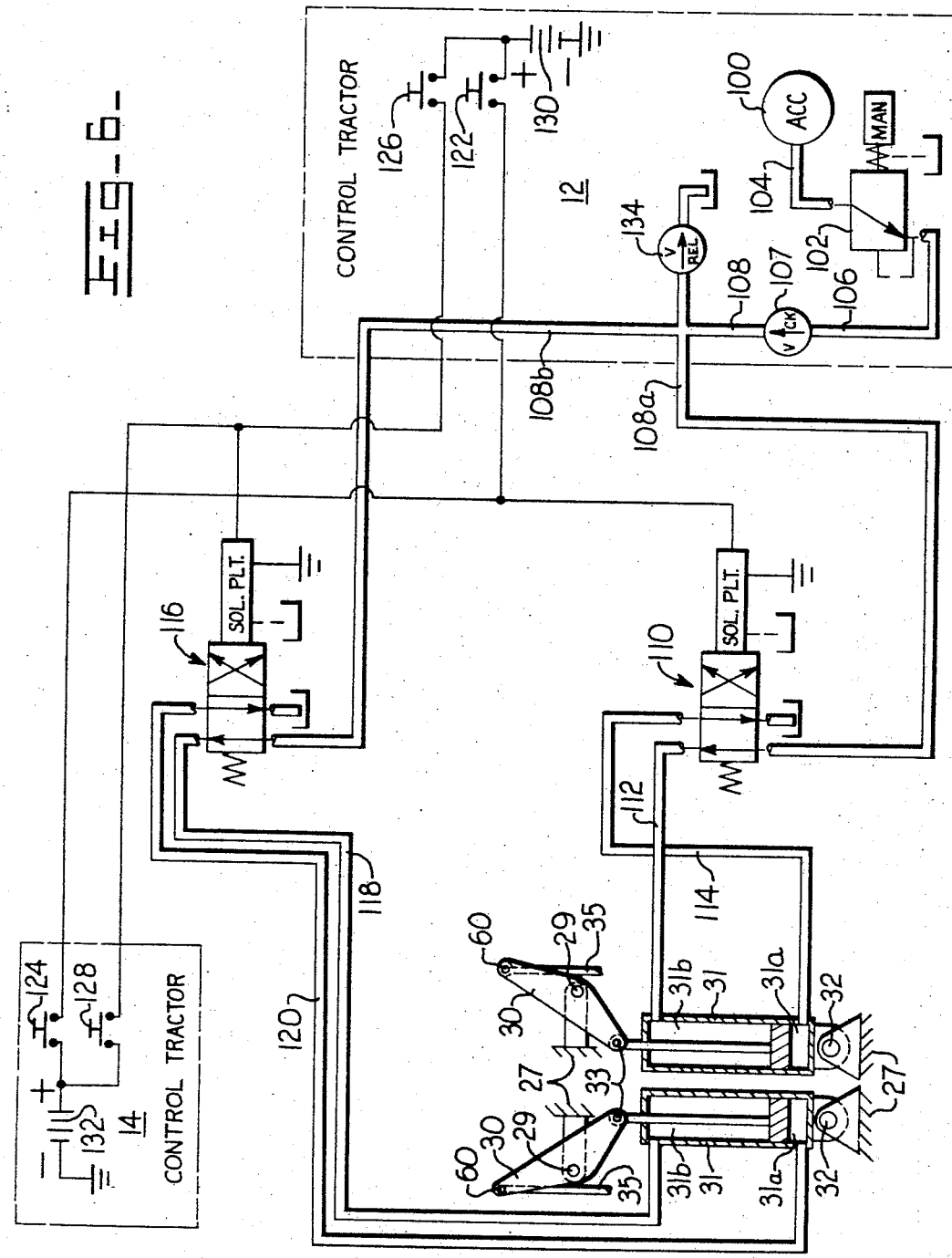

3,427,075
BOTTOM DUMP DOOR MECHANISM AND TWO-STATION CONTROL
Ralph H. Kress, Peoria, Jackson C. Medley, East Peoria, and Donald E. Merritt, Peoria Heights, Ill., assignors to Caterpillar Tractor Co., Peoria, Ill., a corporation of California
Filed May 24, 1967, Ser. No. 641,029
U.S. Cl. 298—35                                  5 Claims
Int. Cl. B60p 1/56; B61d 7/02, 7/28

ABSTRACT OF THE DISCLOSURE

Pivoted bottom dump vehicle doors having a before-center linkage means and hydraulic control means operable from either of two stations to effect opening and closing of the doors and whereby a portion of the force required to maintain the doors in a closed position is provided by a hydraulic motor.

Background of the invention

This invention relates to a before-center or diminishing leverage actuating mechanism and control system for bottom dump doors wherein the doors are controllable from either of two control stations through employment of appropriately combined hydraulic and electrical circuitry. The invention is designed particularly for very large material hauling vehicles such as the 240 ton capacity vehicle disclosed in our assignee's co-pending application Ser. No. 488,985, filed Sept. 21, 1965, now Patent No. 3,330,578 and application Ser. No. 503,037, filed Oct. 23, 1965, now Patent No. 3,356,416.

More particularly, the invention relates to a system whereby the doors are retained in their closed position by the combination of a mechanical diminishing leverage linkage and hydraulic pressure maintained in the door control cylinders. Although the doors are normally operated to both their open and closed positions by hydraulic pressure, one of the primary advantages of the invention resides in the fact that the doors may be controlled by the operator to open by the force of gravity in the event of hydraulic system failure.

In some prior art systems, somewhat similar to the present invention, cable controls are used to actuate the doors to their open and closed positions. Other prior art devices rely upon hydraulic or air motors to actuate the doors with the doors being maintained in the closed position by a dead-center or over-center mechanical linkage such that no load is exerted on the hydraulic or air motors when the doors are in their closed position. In all such prior art devices a force had to be exerted on the door linkage by the related motor to effect door opening. In the event of hydraulic failure resulting in a loss of fluid pressure to activate the door cylinders the doors associated with prior art dead-center or over-center linkages could not be opened without mechanically toggling the linkage off of its dead-center or over-center position. It should be apparent that in a vehicle with the capacity of a 240 ton truck such a pure mechanical opening of the door would be extremely difficult, if not impossible, to accomplish without considerable complexity of the mechanism for manually tripping the linkage over center.

One of the primary objects or advantages of the present invention resides in the feature that the novel before-center linkage mechanism permits the doors to be opened by gravity in the event of hydraulic failure resulting in loss of fluid pressure to actuate the door cylinders.

A related and more specific object of the invention relates to a control system whereby the rod end of the door actuating cylinders can be vented to permit the doors to open by gravity either from their own weight, if the vehicle is empty, or under the added influence of the load, if the vehicle is loaded.

Thus, the present invention has a distinct advantage over prior art devices in that the operator can now dump the payload even in the absence of fluid pressure to activate the hydraulic door control.

The fact that the doors can be opened under the above described conditions results in a further advantage over prior art devices by providing a safety feature in panic situations such as in the case of an uncontrolled loaded vehicle. In prior art devices the advent of source pressure failure could have very serious consequences since the braking capacity of the vehicle would be considerably reduced if not entirely lost and in addition the doors could not be opened to reduce the weight of the vehicle should it be in a loaded condition. In the system comprising the present invention, even in the event of source pressure failure, the doors can be opened, thus dumping the payload and at the same time slowing the truck with the drag of the payload as it spills beneath the truck and builds up in front of the rear tractor wheels. Additionally, the release of the payload renders the available braking more effective by greatly reducing the weight of the vehicle.

Other objects and advantages of the invention will be apparent from the following description and claims and are illustrated in the accompanying drawings which, by way of illustration, show preferred embodiments of the present invention and the principles thereof and what is now considered to be the best mode contemplated for applying these principles.

Brief description of the drawings

FIG. 1 is a view in side elevation of a large truck embodying the present invention;

FIG. 2 is a sectional view with parts broken away and taken on the line II—II of FIG. 1;

FIG. 3 is a perspective view illustrating structured details of the novel before-center linkage mechanism of the present invention;

FIG. 5 is a central longitudinal section view through a hydraulic jack used for actuating the bottom dump doors to which the invention pertains; and FIG. 6 is a schematic view illustrating various hydraulic and electrical controls for the system.

Description of the preferred embodiment

Figure 4:
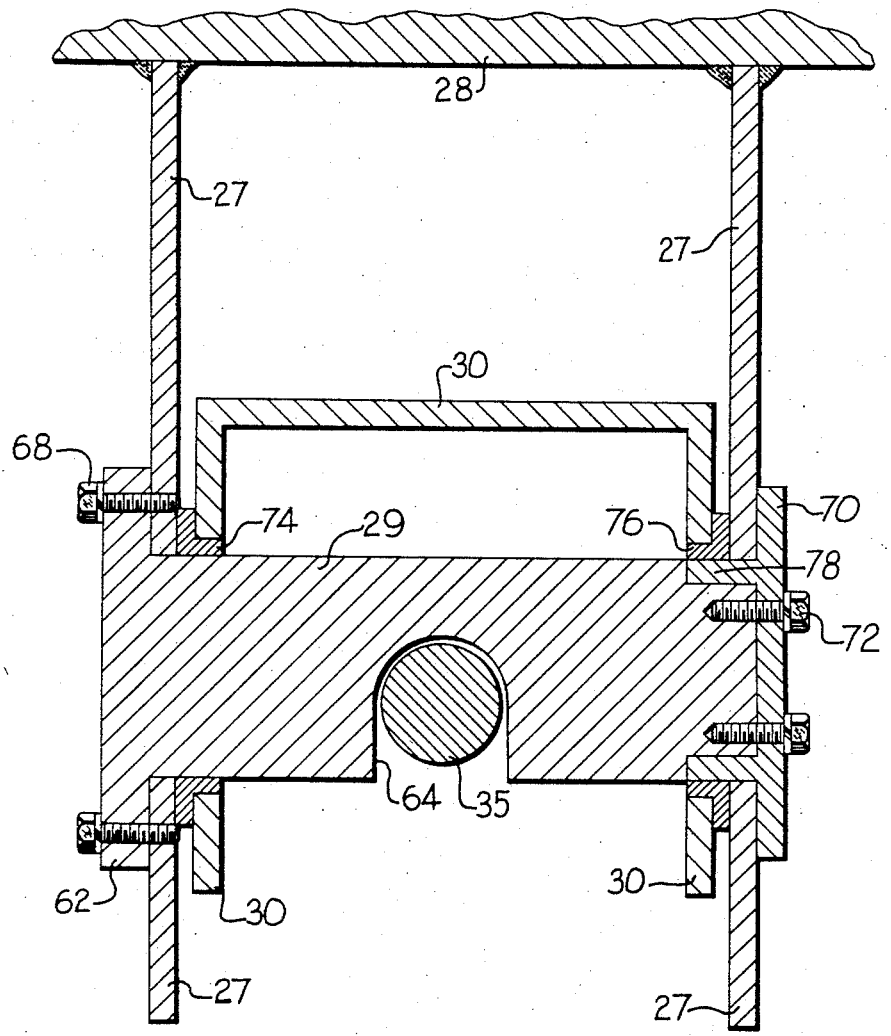
FIG. 4 is a cross-sectional view of the linkage mechanism taken on the lines IV—IV of FIG. 2.

The truck shown in FIG. 1 has a large body 10 for carrying materials which may be discharged from bottom dump doors to be described. Two large tractor units 12 and 14 support the body 10 through king pins 15 and 16. Each tractor unit has its own operator's cab 17 and 18 equipped with dual controls so that certain operations can be controlled from either cab. Each tractor unit 12 or 14 is also provided with an accumulator (not specifically shown in FIG. 1) which will be discussed in greater detail at a later point in the description. A partition shown in dotted lines at 20 extends transversely of the truck body midway between its ends for strengthening the body and to provide a space for door actuating mechanism where it is protected from damage by contact with materials being hauled.

The arrangement of door actuating mechanism within the space provided by the partition 20 is shown in FIG. 2 wherein the near wall of the partition is partially broken away. In this figure, bottom dump doors are shown at 22 as pivotally suspended from pivots 23 arranged at opposite ends of the body. This enables the doors to be swung through the broken line positions illustrated in connection with the door at the left side of the body, the position 22a being a partially opened position and a position 22b being a fully opened position in which the further opening movement is limited by engagement of pads 25 on the doors and stops 26 on the body. The mechanism for opening and closing one door is illustrated, it being understood that the mechanism for the other door is identical.

A supporting bracket of U-shaped cross-section illustrated at 27 is provided on each side of a central partition 28 which divides the partition 20 into two compartments. Each bracket provides a pivot 29 for a bell-crank lever 30 (see FIG. 3) which is actuated by a hydraulic jack 31 disclosed in greater detail in FIG. 5. The jack cylinder is pivoted at 32 in the bracket 27 and the jack rod is pivotally connected at 33 to one end of the lever 30. The full line position of the lever 30 is the position occupied with the door 22 closed. In such a position the upper end of the lever 30 is in contact with a fixed stop 34. A rod 35 is pivotally connected at its upper end to the lever 30, and at its opposite end to a bracket 36 on the door.

Referring now to FIGS. 3 and 4, the details of the lever 30, with parts attached thereto and as mounted in the body mounted brackets 27, are shown disclosing the configuration of the linkage parts to definitely show that the linkage cannot reach a dead-center or over-center position. The particular configuration shown therein is in addition to a fixed mechanical stop 34 (shown in FIG. 2) which serves as a further means of assuring that the linkage is always limited in travel such that a before-center final position for lever 30 is achieved when the doors are closed.

The lever 30 is of generally U-shaped construction with a lower pivot 33 connecting to the rod end of the door cylinder 31 and an upper pivot 60 connected to the link rod 35 which further attaches at its other extremity to the associated bottom dump door 22. The lever 30 is further rotatably mounted on a slotted pin 29 which is retained within the U-shaped mounting bracket 27 which bracket is mounted to the center divider 28 of the transverse partition 20 of the dump body as best shown in FIG. 4.

The pin 29 has a flanged end 62, a centrally located slot 64 and a stepped-end reduced diameter portion 66. In assembly the pin 29 is fitted through the bracket 27 and lever 30 from the left side and the flanged end 62 is bolted to the outside of bracket 27 by a plurality of bolts 68. A counter-bored cap member 70 is then fitted through the right side of bracket 27 such that the counter-bore fits over the stepped end 66 of pin 29 and is secured to the pin by a plurality of bolts 72 which thread into the reduced diameter end of the pin. The lever 30 pivots about pin 29 at the left side on an L-shaped combination thrust and sleeve bearing 74 of suitable material, and on the right side lever 30 pivots on a similar bearing 76 which fits over the counter-bored extension 78 of cap 70.

Once the lever 30 is attached in bracket 27 as described above, the operating cylinder 31 is installed between lever pivot 33 and a ground pivot 32 in bracket 27 (see FIG. 2). The link rod 35 is then installed between upper pivot 60 of the lever 30 and the door bracket 36.

The linkage parts are shown in FIGS. 3 and 4 in the position they assume when the doors are closed. It can be seen that the depth of slot 64 in pin 29 will determine how far the upper pivot 60 can move with respect to the pivot pin 29 as the door is closed. As will be particularly noted in FIG. 4, if the center of rod 35 were to coincide with the center line of pin 29, the linkage would be considered dead-center. If the center of the rod moves past the center line of the pin (i.e., a deeper slot 64) the linkage would be considered over-center. In the present instance, the center of rod 35 is restricted in travel by the depth of slot 64 such that it approaches the center line of the pin 29 as the door closes but is always stopped short of what could be termed an over-center or dead-center position. The mechanical stop 34 further ensures that the linkage is prevented from movement to a dead-center or over-center position, and further prevents damage to the linkage system by eliminating the possibility of rod 35 being bent by contact with the inside of slot 64 in moving too far. It should be further observed that in such a door closed position the force of gravity would allow the doors to swing to an open position were it not for the presence of a holding force exerted through the jack 31.

Hydraulic jack 31 may be partially extended to swing the door to the position shown at 22a or may be fully extended to swing the door into the position illustrated at 22b. This is accomplished through the jack structure shown in FIG. 5 wherein the jack is shown as having a rod 38 provided with a piston head 39 at one end thereof and a smaller or auxiliary head 40 associated therewith. The hydraulic circuitry for operating the jack 31 will be further disclosed at a later point in the specification and is not considered necessary for an understanding of the operation of the jack per se. It will suffice to know, however, that the door jacks may be actuated from controls in either tractor cab and that they may be supplied selectively with hydraulic fluid at a nominal pressure of say 1,000 pounds and a higher pressure of 1,600 to 2,000 pounds.

The jack of FIG. 5 is illustrated in its retracted position as with the doors closed. To open the doors to a partially open position, fluid is supplied at the lower pressure at the head end of the jack as through a passage 42. Fluid from the rod end of the jack is discharged and returned to the source through passage 44. When the auxiliary head 40 of the piston enters a reduced diameter in the cylinder 31 provided by a sleeve 46 exit of rod chamber fluid through passage 44 is prohibited and the piston comes to rest against the body of fluid within the sleeve. This is the partially extended position which moves the door to the position shown at 22a in FIG. 2.

To impart further or full opening to the door, the higher pressure is directed to the cylinder through the port 42 and so increases the pressure within the sleeve 46 until it opens a spring-closed check valve shown at 48 permitting fluid to escape from the sleeve through the auxiliary piston 40 and out through the passage 44. Closing of the doors is effected by directing pressure inwardly of the cylinder through passage 44 which will first be effective against a surface 50 in back of the piston 39 and later also against the face of the auxiliary piston 40.

During opening of the doors, the great weight of the load within the body tends to open the doors more rapidly than fluid can be expelled from the rod end of the jack through the passage 44. In order to prevent undesirable delay in the opening of the doors, excessive pressure in the rod end of the jack is relieved through a spring-closed check valve 52 communicating pressure from the rod end through the piston to the opposite end of the jack or in effect bypassing fluid to permit increased speed of the door opening operation.

Turning now to the schematic circuit shown in FIG. 6, all parts within the phantom line block labeled "control tractor 12" are located on tractor 12 and all parts within the phantom line block labeled "control tractor 14" are located on the tractor 14. All components, including electrical circuitry not shown in the phantom line blocks, are on the dump body itself. Hydraulic pressure fluid for controlling both door cylinders is taken from an accumulator 100 on tractor 12 through a conduit 104 and a manually operated two-pressure regulator valve 102 to a conduit 106. A check valve 107 is positioned between conduit 106 and a conduit 108 to prevent fluid from returning to the accumulator from the door control circuit as might otherwise occur in the event of source pressure failure. Conduit 108 is branched to a conduit 108a supplying a four-way solenoid pilot-operated valve 110 which controls fluid to the right door cylinder 31 over conduits 112 and 114 and a conduit 108b which supplies an identical four-way valve 116 to control the left cylinder 31 over conduits 118 and 120.

The purpose of the manually controlled two-pressure valve 102 on tractor 12 is to permit selective operation of the doors through application of either one-half or full accumulator pressure to the hydraulic circuit. This permits the two-position door operating feature described above. In the particular embodiment disclosed in FIG. 6, the two-position opening feature of the doors can be controlled only from tractor 12. It is generally sufficient if the two-position door opening feature be effected only from one tractor such as tractor 12. However, it is to be understood that suitable electrical circuitry could be provided such that the two-position door opening feature might be controlled from either tractor 12 or tractor 14.

The four-way valves 110 and 116 may be electrically controlled from either tractor for door controlling functions. A suitable switch 122 on tractor 12 or a switch 124 on tractor 14 is actuated to control the valve 110 to activate the right cylinder 31. A switch 126 in tractor 12 or switch 128 in tractor 14 controls valve 116 to activate the left cylinder 31. When operating the controls from tractor 12, the battery 130 of tractor 12 furnishes power to operate the four-way solenoid valves 110 and 116. The same function may be effected from tractor 14, in which case the battery 132 of tractor 14 provides the power source.

With the control components as shown, no electrical power is being applied to a solenoid valve and the cylinders 31 are retracted, thus holding the doors closed. In this condition, the bias springs of four-way valves 110 and 116 hold the valves in the position shown and it will be noted that pressure fluid is communicated from the line 108 through both valves to the rod end of the associated door cylinder (chamber 31b) while the head end (chamber 31a) is communicated with the reservoir. Such an arrangement ensures that the door cylinders have accumulator pressure in the rod end at all times when the control is not actuated thus maintaining the cylinders retracted. The circuits to the cylinders is blocked by check valve 107 such that no fluid can return from the cylinder chambers 31b. This provides a fail-safe feature since once the doors are closed the rod end of the cylinders are pressurized and even if the accumulator loses pressure, check valve 107 prevents loss of fluid volume from the rod end of the door cylinders, thus the doors are permanently closed. The relief valve 134 in the common pressure line 108 is to permit a small amount of fluid to bleed off to relieve pressure build-up due to possible thermal expansion.

When the solenoid of either valve 110 or 116 or both is energized by actuation of the electrical control in either tractor the solenoid overcomes the force of the biasing spring to move the valve spool leftwardly to reverse the pressure lines, applying pressure to the head end of the associated cylinder and venting the rod end to power the cylinder to extend and open the door. Even if no actuating pressure were available, such operation of the electrical controls would permit the doors to open to the first opening position as shown in FIG. 2 by venting the rod end chambers 31b and permitting the door to open by gravity. This provides another advantageous feature and it is possible because the lever 30 is in a before-center position and thus not locked up mechanically as it would be in the case of a dead-center or over-center linkage system.

We claim:

1. Means for actuating pivoted bottom dump vehicle doors which swing outwardly away from each other toward open positions comprising a lever for each door pivoted at a first pivot between its ends, a link pivoted at a second pivot located between one end of the lever and the door, a hydraulic motor for imparting pivotal movement to the lever, said first pivot having a slot formed therein for receiving said link, said slot having a depth such that said link may closely approach the center line of said pivot but is always stopped short thereof so that said second pivot is slightly before-center with respect to said first pivot when the doors are closed and whereby a portion of the force required to maintain the doors closed is provided by the hydraulic motor.

2. A device as set forth in claim 1 wherein an auxiliary stop member is located on the vehicle body for cooperation with said slot to limit pivotal movement of the lever after the doors have been moved to a closed position.

3. A device as set forth in claim 1 wherein said vehicle is equipped with a tractor unit at each end and wherein each tractor unit is provided with control means for actuating said hydraulic motor.

4. A device as set forth in claim 3 wherein first control means are provided at one tractor for actuating said hydraulic motor and said other tractor is provided with second control means for controlling the extent of operation of said first control means at said one tractor.

5. A device as set forth in claim 4 wherein the first control means at said one tractor comprises an electrical control and wherein the second control means at said other tractor comprises hydraulic and electrical controls.

References Cited

UNITED STATES PATENTS

| 3,076,680 | 2/1963 | Kress | 298—35 |
| 3,169,491 | 2/1965 | Darlington | 105—240 |
| 3,173,381 | 3/1965 | Charles | 298—35 X |
| 3,298,745 | 1/1967 | Czapiewski | 298—37 |
| 3,363,916 | 1/1968 | Kress et al. | 280—423 X |

FOREIGN PATENTS 487,402  10/1952  Canada.

RICHARD J. JOHNSON, *Primary Examiner.*

U.S. Cl. X.R.

105—240